US009306749B2

(12) United States Patent
Naccache

(10) Patent No.: US 9,306,749 B2
(45) Date of Patent: Apr. 5, 2016

(54) METHOD OF BIOMETRIC AUTHENTICATION, CORRESPONDING AUTHENTICATION SYSTEM AND PROGRAM

(75) Inventor: David Naccache, Paris (FR)

(73) Assignee: INGENICO GROUP, Paris (FR)

( * ) Notice: Subject to any disclaimer, the term of this patent is extended or adjusted under 35 U.S.C. 154(b) by 320 days.

(21) Appl. No.: 13/579,775

(22) PCT Filed: Feb. 17, 2011

(86) PCT No.: PCT/EP2011/052349
§ 371 (c)(1),
(2), (4) Date: Oct. 15, 2012

(87) PCT Pub. No.: WO2011/101407
PCT Pub. Date: Aug. 25, 2011

(65) Prior Publication Data
US 2013/0040606 A1 Feb. 14, 2013

(30) Foreign Application Priority Data

Feb. 19, 2010 (FR) ...................................... 10 51216
Mar. 1, 2010 (FR) ...................................... 10 51464

(51) Int. Cl.
*H04W 12/06* (2009.01)
*H04L 9/32* (2006.01)
*H04L 29/06* (2006.01)

(52) U.S. Cl.
CPC .......... *H04L 9/3231* (2013.01); *H04L 63/0492* (2013.01); *H04L 63/0861* (2013.01); *H04W 12/06* (2013.01); *H04L 2209/56* (2013.01); *H04L 2209/80* (2013.01)

(58) Field of Classification Search
CPC . H04L 63/0861; H04L 63/105; H04L 63/107; H04W 12/06
See application file for complete search history.

(56) References Cited

U.S. PATENT DOCUMENTS 6,591,242 B1 7/2003 Karp et al.
2003/0140246 A1 7/2003 Kammer et al.
(Continued)

FOREIGN PATENT DOCUMENTS

EP 1696626 A1 8/2005
WO 2006126171 A1 11/2006
(Continued)

OTHER PUBLICATIONS

International Search Report dated Mar. 17, 2011 for corresponding International Application No. PCT/EP2011/052349, filed Feb. 17, 2011.
(Continued)

*Primary Examiner* — Liton Miah
(74) *Attorney, Agent, or Firm* — David D. Brush; Westman, Champlin & Koehler, P.A.

(57) ABSTRACT

A method and apparatus are provided for biometric authentication of a user to be authenticated, from among a plurality of users, with an authentication system storing a set of pieces of reference biometric data, each associated with one of the users. The method includes providing, by the user to be authenticated, a piece of biometric authentication data by a device for obtaining biometric data from a transactional terminal. A subset of the set of pieces of reference biometric data stored by the authentication system is searched for a piece of reference biometric data corresponding to the user to be authenticated as a function of the piece of biometric authentication data. The step of searching includes filtering the pieces of reference biometric data as a function of: a base station of a mobile communications network; and a set of mobile devices for which a connection indicator is activated for the base station. The transactional terminal is substantially near a zone of coverage of the base station.

12 Claims, 2 Drawing Sheets

(56) References Cited

U.S. PATENT DOCUMENTS

| | | | |
|---|---|---|---|
| 2003/0222797 A1* | 12/2003 | Futa et al. | 340/995.18 |
| 2004/0036574 A1* | 2/2004 | Bostrom | 340/5.82 |
| 2006/0104224 A1* | 5/2006 | Singh | G06F 21/32 370/310 |
| 2006/0120568 A1 | 6/2006 | McConville et al. | |
| 2006/0200427 A1* | 9/2006 | Morrison et al. | 705/67 |
| 2007/0092114 A1* | 4/2007 | Ritter et al. | 382/115 |
| 2007/0185811 A1* | 8/2007 | Weiss et al. | 705/50 |
| 2008/0223926 A1* | 9/2008 | Miller et al. | 235/382 |
| 2009/0307139 A1* | 12/2009 | Mardikar et al. | 705/67 |
| 2010/0119126 A1* | 5/2010 | Rane | G06K 9/00067 382/125 |

FOREIGN PATENT DOCUMENTS

| | | |
|---|---|---|
| WO | 2008002979 A2 | 1/2008 |
| WO | 2009128854 A1 | 10/2009 |

OTHER PUBLICATIONS

Written Opinion dated Mar. 17, 2011 for corresponding International Application No. PCT/EP2011/052349, filed Feb. 17, 2011.

* cited by examiner

METHOD OF BIOMETRIC AUTHENTICATION, CORRESPONDING AUTHENTICATION SYSTEM AND PROGRAM

CROSS-REFERENCE TO RELATED APPLICATIONS

This Application is a Section 371 National Stage Application of International Application No. PCT/EP2011/052349, filed Feb. 17, 2011, which is incorporated by reference in its entirety and published as WO 2011/101407 on Aug. 25, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the authentication of users by biometrics.

More specifically, the disclosure pertains to systems of biometric authentication enabling users to perform a predetermined action, for example to make a payment.

BACKGROUND OF THE DISCLOSURE

Biometrics is commonly used to identify and/or authenticate users on the basis of individual physical characteristics.

Such an identification using biometrics, implemented by a biometric authentication system, comprises the following three main steps:
  capturing a reference biometric sample coming from the authorized user (for example a reference image of an authorized user);
  creating a reference file or « reference signature » (which includes at least one characteristic element of the reference image) by means of a specific processing operation applied to the reference biometric sample, and then storing this reference file;
  carrying out a verification wherein, just as in the above capturing and creating steps, a biometric sample to be compared coming from the user to be authenticated is captured and a file to be compared or « signature to be compared » is created and then the reference file is compared with the file to be compared to determine their rate of similitude and to take the requisite decision.

Thus, the stored pieces of information are not biometric samples but mathematical models of these samples which distinguish one biometric sample from another. This model is called a « signature » or a « template ».

The creation of a reference signature is done during a phase known as an enrolment (or learning) phase which groups together the steps for capturing the reference biometric sample, creating and storing the reference signature and storing pieces of information on the user's identity such as his family name, forename, identifier (personal identification number).

The authentication of a user by biometrics can be based especially on the measurement (or capture) of at least one of the following biometric samples, or a combination of one or more of the following biometric samples:
  his fingerprint;
  his palm print (hand print);
  his retinal print;
  his iris print;
  his face print (the shape of the face).

One drawback of these prior art biometric authentication systems lies in their slowness when they are used to reference a large number of users (for example to control access to an urban rail network in major urban agglomeration or to authenticate a user of a bank card).

Indeed, the duration of the verification step during which the authentication decision proper is taken depends on the number of users referenced in the authentication system. The greater the number of users, the greater is the number of potential comparisons to be made to determine or not determine the authentication of a user.

Thus, the greater the number of users, the slower is the system. Furthermore, the increase in the number of users tends to increase the probability of collision between biometric data and hence reduce the general reliability of the system (this is the phenomenon known in the prior art as the « false positive(s) » phenomenon).

One corollary of this latter drawback is that it is difficult to implement a method of payment by means of biometric data. Indeed, to make it possible to set up such a method of payment, it is necessary to compare the user's biometric data with a large number of pieces of biometric data pertaining to other users, pieces of data that very probably belong to financial establishments and which could prove to be very complicated to obtain. Now, as a matter of principle, a user should not disclose information about his bank, and the comparison of the user's biometric data should be done on all the pieces of data recorded in the authentication system.

SUMMARY

An embodiment of the invention proposes a method of biometric authentication of a user to be authenticated, from among a plurality of users, with an authentication system storing a set of pieces of reference biometric data, each associated with one of said users, the method including steps for:
  the providing, by said user to be authenticated, of a piece of biometric authentication data by means of a device for obtaining biometric data from a transactional terminal;
  searching, in a subset of said set of pieces of reference biometric data stored by said authentication system, for a piece of reference biometric data corresponding to said user to be authenticated, as a function of said piece of biometric authentication data, According to the invention, said step for searching comprises a step for filtering said pieces of data of said set of pieces of biometric data as a function of:
  a base station of a mobile communications network; and
  a set of mobile devices for which a connection indicator is activated for said base station,
  said transactional terminal being substantially near a zone of coverage of said base station.

Thus the invention makes it possible to sharply restrict the number of pieces of reference biometric data for which it is necessary to make a comparison with the biometric data provided by the user to be authenticated. This restriction greatly accelerates the authentication process and enables for example a payment to be made by using the authentication method of the invention. Indeed, the number of mobile devices connected simultaneously to a base station is extremely restricted as compared with a potential number of users for whom it would be obligatory to make the search without the method of the invention. The authentication operation, and therefore the payment operation, is therefore much swifter. This authentication operation is also far more secured since the implicit localization of the user's mobile device (the mobile device is also connected to the base station, without which the search step would be fruitless) makes sure that the user who wishes to make the payment is truly at the location in which the authentication takes place.

The utility of this authentication method is naturally not restricted to payment. It is quite possible to implement such a method to set up access control based on the possession of a mobile device, for example in the case of access to a firm. The base station is then replaced by a WiFi access point and the mobile device must then possess WiFi connection capacities.

Thus the invention relies on a novel and inventive approach to biometric authentication in a system referencing a very large number (for example millions) of users, in which the pieces of reference information associated with the users of the system are filtered as a function of the users having available a mobile device connected to a base station whose coverage zone covers the location of the transactional terminal. Thus the number of users for whom it is necessary to compare biometric data is restricted as a function of the very localization of the user who performs the action such as the payment. It is therefore no longer necessary to compare the user's biometric data with a very large number of pieces of biometric data. Rather, it has to be compared with a far more restricted number (about a thousand), making the operation appreciably faster and comprising far fewer risks of false positives.

Thus, the authentication of the user is done on a subset of said set of pieces of reference biometric data, identified by the base station of the communications network of the communications operator or service provider.

This approach enables a user to be speedily identified, even in a system comprising a very large number of referenced users, by the filtering of the entire set of pieces of reference information, through this set being partitioned into several subsets.

According to one particular embodiment of the invention, said filtering step comprises:
  a step for identifying said base station covering said coverage zone in which said transactional terminal is situated;
  a step for identifying said set of mobile devices for which a connection indicator is activated for said base station, delivering a set of identifiers of candidate mobile devices;
  a step for obtaining said subset of said set of pieces of reference biometric data as a function of said set of identifiers of the candidate mobile devices.

According to one particular characteristic of the invention, said pieces of biometric data belong to the group comprising:
  fingerprints;
  palm prints;
  retinal prints;
  iris prints;
  facial shapes;
  combinations of said pieces of biometric information mentioned here above.

According to one particular embodiment of the invention, said method of biometric authentication furthermore comprises a step for the entering, by said user, of a confidential code.

Thus the invention makes it possible to sustain the assertion of authentication that was delivered following the search and following the comparison of the user's biometric data.

According to one particular embodiment of the invention, said filtering step furthermore comprises a step for entering a piece of information representing the sex of said user.

Thus the time needed for the authentication is statistically halved. This entering step takes place on the transactional terminal.

According to one particular embodiment of the invention, said filtering step furthermore comprises a step for selecting a telephone operator with whom said user's said mobile device is registered.

Thus the implementation of the invention is not limited to a single telephone operator. This entering step takes place on the transactional terminal.

According to one particular characteristic of the invention, said method furthermore comprises a step for the entering, by said user, of a confidential code.

According to one particular characteristic of the invention, said confidential code is transmitted to said authentication system concomitantly with said pieces of biometric data provided by said user.

According to one particular embodiment of the invention, said transactional terminal is a mobile payment terminal connected to said mobile communications network to which said base station belongs.

According to one particular characteristic of the invention said transactional terminal is connected to said base station.

According to one particular embodiment of the invention, said method furthermore comprises a step for transmitting, to said transactional terminal, said subset of said set of pieces of biometric data and said filtering step is implemented within said transactional terminal.

According to one particular embodiment of the invention, said method comprises a step for transmitting, to a destination base station to which said user is liable to get connected, pieces of biometric data on said user, said transmitting being done through a current base station to which said user is connected.

The invention also concerns a system for the biometric authentication of a user to be authenticated, from among a plurality of users, with an authentication system storing a set of pieces of reference biometric data, each associated with one of said users, comprising means for:
  the providing, by said user to be authenticated, of a piece of biometric authentication data by means of a device for obtaining biometric data from a transactional terminal;
  searching, in a subset of said set of pieces of reference biometric data stored by said authentication system, for a piece of reference biometric data corresponding to said user to be authenticated, as a function of said piece of biometric authentication data, According to the invention, said means for searching comprise means for filtering said pieces of data of said set of pieces of biometric data as a function of:
  a base station of a mobile communications network; and
  a set of mobile devices for which a connection indicator is activated for said base station,
  and said device for obtaining biometric data being substantially near a zone of coverage of said base station.

The invention also pertains to a computer program product downloadable from a communications network and/or recorded on a computer-readable carrier and/or executable by a processor, comprising program code instructions to implement the method of biometric authentication described here above.

BRIEF DESCRIPTION OF THE DRAWINGS

Other characteristics and advantages of the invention shall appear more clearly from the following description of a particular embodiment given by way of a simple, illustrative and non-restrictive example, and from the appended drawings, of which.

DETAILED DESCRIPTION OF ILLUSTRATIVE EMBODIMENTS

1. General Principle

Figure 1:
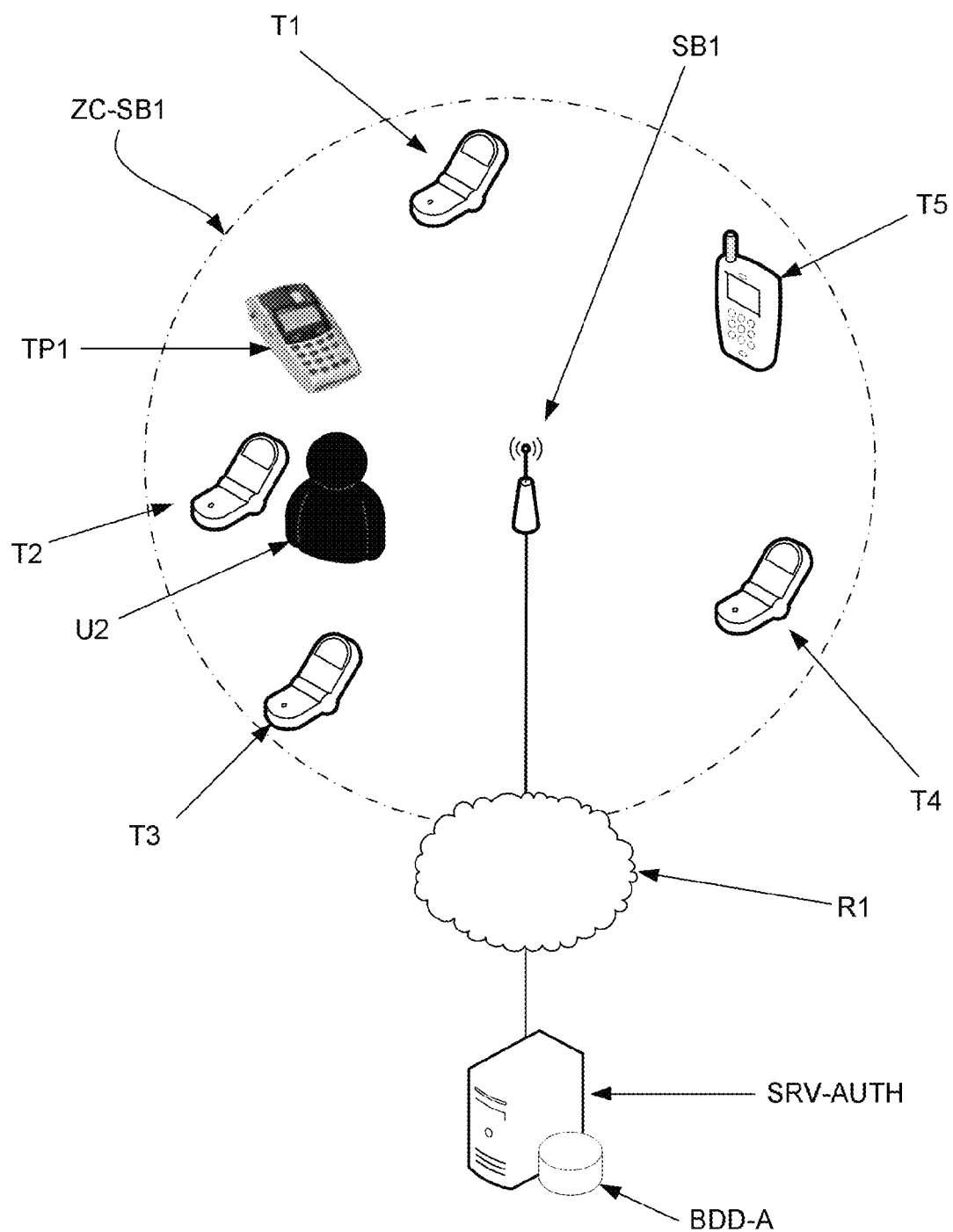
FIG. 1 presents the context of implementation of the method of biometric authentication according to the invention.

The general principle of an embodiment of the invention relies on the delegation of the localizing and identifying of a user with a plurality of apparatuses of a communications network in order to facilitate the issuing of an assertion of authentication on the basis of pieces of biometric data furnished by the user. These pieces of biometric data are compared with a set of pieces of biometric data on users referenced in a biometric authentication system. According to an embodiment of the invention, the geographical localization of the user, for example through his mobile device (mobile telephone, PDA or tablet) drastically reduces the number of comparisons to be made firstly to identify the user and secondly to authenticate him or her.

One of the main characteristics of mobile terminal networks is that a mobile device, whatever it may be, is permanently covered by a base station (BTS).

When an apparatus exits the coverage zone of a base station it is transferred to another base station. This transfer is done in order to improve the quality of the signal.

In other words, the telecommunications operator has real-time knowledge of the approximate geographical position of a mobile device in the mobile telecommunications network: the mobile device is situated in the zone of coverage of the base station to which it is attached.

The method of an embodiment of the invention generally makes use of this localization. The method of an embodiment of the invention makes it firstly to use a mobile device held by the user as a vector enabling authentication and secondly to prevent problems of slowness and collision (false positives) inherent to authentication systems referencing a very large number of users, especially biometric authentication systems. Furthermore, the method of an embodiment of the invention works whatever the type of mobile device belonging to the user; the user does not need to have a latest-generation or highly sophisticated mobile device to benefit from the advantages of an embodiment of the invention.

Such systems can be used to make payments simply without a user needing to make use of a bank card or have a particular mobile device.

Such systems can also be used to control access to a building, firm, geographical area, show, event, installation or transportation means in big urban agglomeration and thus reference a very large number of users.

Here below, to illustrate the method according to an embodiment of the invention, we consider a system of this kind that makes it possible, by biometric authentication, to carry out a payment in a shopping center. In this case, a user wishing to make a purchase is authenticated firstly through his mobile device and secondly through one or more biometric characteristics.

According to an embodiment of the invention, in order to prevent an excessive slowness of the system and enable the referenced users not to be slowed down by biometric authentication and therefore to speedily perform the transaction, a localization of the user's mobile device is carried out.

More particularly, this information on localization is obtained by a comparison of the user's biometric data with a restricted number of pieces of biometric data, namely the biometric data of other users situated in the same localization zone as the user, i.e. connected to a same apparatus of the communications operator, such as for example a base station. As a rule, the maximum number of users connected to a base station is in the range of a thousand. A filtering is therefore done of pieces of biometric data to be compared with those furnished by the user.

Thus, instead of verifying the authenticity of one user among all the users referenced, which consumes a great amount of time and is liable to set up "false positives", the method of an embodiment of the invention verifies the authenticity of a user in a subset (about a thousand) of referenced users, thus reducing the duration of the authentication and its efficiency.

Referring to FIG. 1, a general technical context is presented for implementing the method of an embodiment of the invention. A base station (SB1) is connected through a telecommunications network (R1) to an authentication server (SRV-AUTH). The base station has a coverage zone (ZC-SB1) within which mobile devices are identified and connected or recently connected (for example the terminals T1 to T5). The connection of a device is defined by the presence of a connection indicator indicating connection of the mobile device. For example, if the mobile device is connected, a connection indicator is activated. If the mobile device has been connected recently (for example less than five minutes earlier), a connection indicator is also in an activated position for this mobile device. The authentication server (SRV-AUTH) which, in a specific embodiment of the invention, may be an MSC (mobile services switching center or VLR (visitor location register) or HLR (home location register) includes a biometric data base (BDD-A) comprising more particularly pieces of biometric data on users of mobile devices. When the authentication server is the MSC, it advantageously contains the biometric data of only the terminals T1 to T5 connected to the base station (SB1). In the context of the implementation of an embodiment of the invention, there is also a transactional terminal TP1 which is situated in the coverage zone (ZC-SB1) of the base station (SB1) and comprises means for obtaining biometric data (such as a fingerprint scanner). In the context of this example, it is assumed that the user U1 with the mobile device T2 at his disposal wishes to make a purchase and pay for it by using the transactional terminal TP1. Naturally, this system can be implemented in other cases, such as authentication at a border post or access to a secured zone. In general, in the context of an embodiment of the invention, the transactional terminal comprises or is connected to a device for obtaining biometric data. In many cases, the transactional terminal directly integrates the device for obtaining biometric data.

Prior to the process of an embodiment of the invention for identifying and authenticating the user, a stage is provided of registering a user wishing to make use of the advantages of an embodiment of the invention with a service provider such as a communications operator.

During this registration stage, the user shows, among other pieces of data, an identity document, selects or obtains a confidential code (for example a code comprising four decimal figures) and one or more pieces of biometric data known as reference data (for example a fingerprint). These pieces of data are registered appropriately by the service provider. This registration stage can be performed either by means of a Web service to which the user is connected or preferably it can be done physically in a dedicated location by the service provider, for example to obtain the biometric information in a secured manner.

The advantages procured by an embodiment of the invention include the following:

- the device has no need whatsoever to be provided with new equipment: the user does not need to be provided with new equipment. This solution is therefore economically very worthwhile.
- an embodiment of the invention provides a totally "hands-free" solution: during the payment operation, the user uses only his hands. He does not need to take his telephone out of his pocket or withdraw a bank card from his wallet (which means that there are fewer risks of robbery).
- the device works with any telephone whatsoever: it is not necessary to change mobile devices for the system to work. The mere fact of having a mobile device available is enough.
- the system is simple for the user, enabling swift adoption.
- the system is reliable: to carry out fraud, it would be necessary to steal the user's mobile device, cut his finger off (when the pieces of biometric data represent a fingerprint) and determine his confidential code. Fraud is therefore highly improbable.
- finally, telecommunications operators are always searching for ways to limit the fickleness of their subscribers (in other words to create subscriber loyalty), and the fact of associating payment functions with a mobile device is likely to reduce fickleness and create subscriber loyalty.

2. Description of One Embodiment

Figure 2:
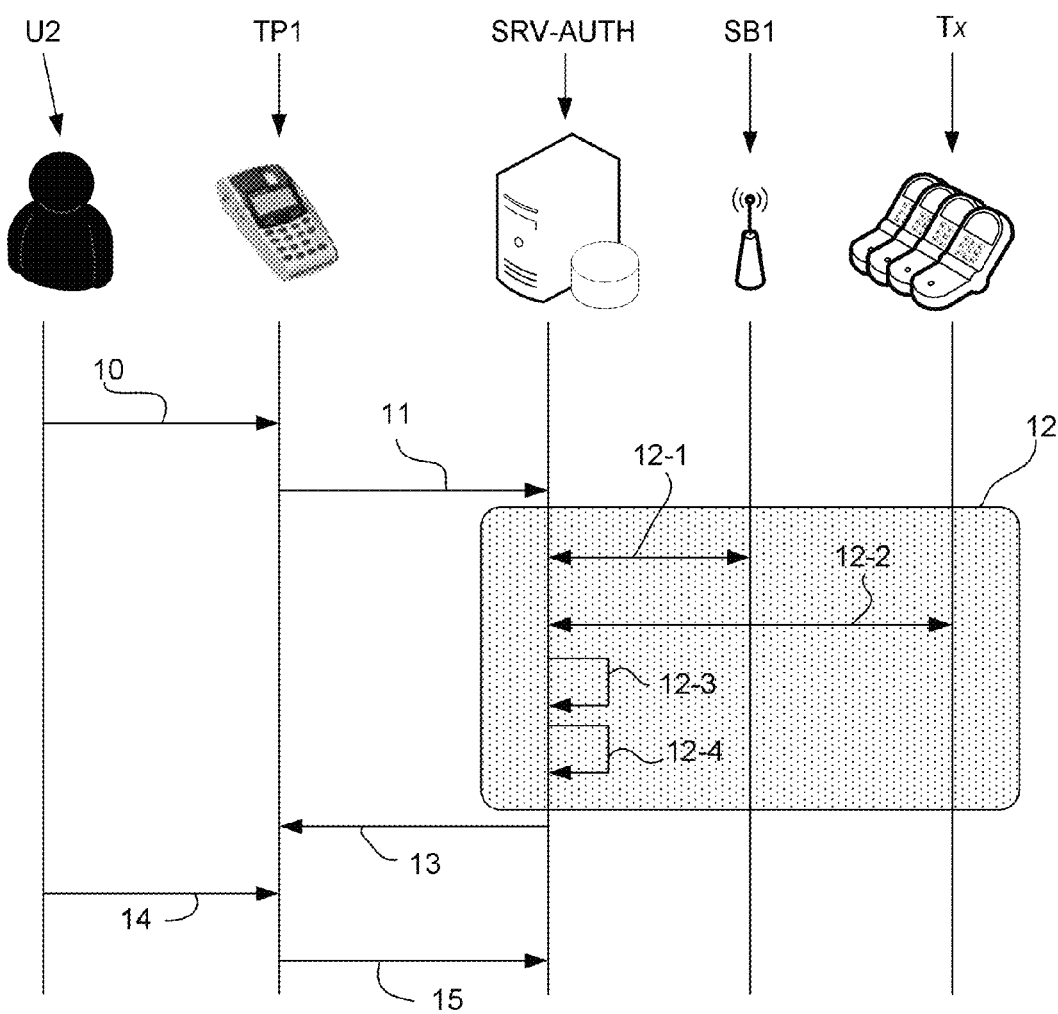
FIG. 2 illustrates the steps of a particular embodiment of the method according to the invention.

Referring now to FIG. 2, we present the main steps of the method of biometric authentication according to an embodiment of the invention in which the transactional terminal is a payment terminal used to make purchases and the mobile device is a telephone. This transactional terminal, in this embodiment, includes the device for obtaining pieces of biometric data, for example a fingerprint reader.

As a rule, when a purchase is being made, a user must provide two pieces of information through the interface of the authentication system such as the transactional terminal:

- a piece of biometric data for authentication 10;
- a piece of information confirming payment 14 (for example a confidential code or again an "OK" type of validation).

The piece of biometric information on authentication 10 is used in a step 12 of searching for the user's mobile device from among a plurality of mobile terminals connected to a base station to which the transactional terminal used is attached. This search is made by comparing the piece of biometric authentication data with a plurality of reference biometric data preliminarily stored in the operator's network.

More specifically, in a first embodiment of the invention, the method of biometric authentication comprises the following steps:

- a step 10 for obtaining a piece of biometric data from the user (for example a fingerprint obtained from a suitable fingerprint reader mounted for example on a transactional terminal);
- a step 11 for transmitting biometric data to an authentication server (which may be situated for example in the telecommunications network managed by the communications operator). In this embodiment, the transmission of the biometric data is accompanied by the transmission of the amount of the transaction preliminarily entered by the shopkeeper from whom the user wishes to make a purchase.
- a step 12 of searching for the piece of reference biometric data, corresponding to the previously obtained biometric data, from among the plurality of pieces of reference biometric data corresponding to the plurality of users connected to the base station of the communications operator. Thus, a smart filtering is performed on the reference biometric data to be compared.

This searching/filtering step comprises several steps:

- a step 12-1 for obtaining at least one identifier of a reference base station in the zone in which the device for obtaining biometric data (for example the transactional terminal) is situated;
- a step 12-2 for obtaining a set of identifiers of mobile devices connected to said at least one reference base station;
- a step 12-3 for obtaining a plurality of pieces of biometric data from the identifiers of mobile devices which corresponds to the filtering proper;
- a step 12-4 for comparing these pieces of biometric data with the biometric data obtained by the device for obtaining biometric data, when the user's mobile device is identified from the biometric data obtained from the user and the set of pieces of biometric data of the users whose terminals are connected to the reference base station, the method comprises a step 13 for transmitting a request for obtaining a confidential code of the user, followed by a step 14 for entering this confidential code and a step for validating the transaction 15,

- this confidential code is the code given during the registration phase;
- the confidential code is entered in the transactional terminal, as usual, by the user;
- the confidential code is verified and the transaction is validated by the operator: he debits the user's account and credits the shopkeeper's account.

If the search step does not make it possible to identify the user's mobile device as being connected to a base station, several possibilities can be envisaged:

- quite simply abandoning the transaction;
- asking for a payment card to be produced: the transaction then continues in a classic way through the use of a payment card and the confidential code of the user's payment card.

When the confidential code of the method of an embodiment of the invention entered during the validation is not valid, several possibilities can be envisaged:

- quite simply abandoning the transaction;
- possibly making a fresh attempt (up to three attempts). If all three attempts fail, the user's account is blocked and he can no longer make any payment using these means. He would have to contact the service provider to reactivate his account.

In a second embodiment of the invention, the entering of the confidential code is confidential. Indeed, this entering operation is an additional security measure but it is not obligatory. However, it ensures that the user truly has this information at his disposal. It is envisaged, in at least one other embodiment, to make this entering operation obligatory only if the transaction exceeds a certain amount that can be parameterized according to the user, for example during the stage of his registration.

In a third embodiment, the code is not confidential and is used only to discriminate (identify) the user's biometric data more speedily.

3. Searching for Pieces of Information and Comparing Them

The identification and authentication proper takes place during a searching stage 12 which takes account of the biometric data delivered by the user 10.

The authentication biometric data 10 corresponds to a "simple" biometric sample of the user to be authenticated, such as a fingerprint, a palm print, a retinal print, an iris print, a facial shape etc or a combination of several of these "simple" samples, for example a combination of a fingerprint and an iris print.

In addition to the steps mentioned here above, the search stage 12 classically comprises at least two steps: a first step for determining a biometric "signature" of the user to be authenticated on the basis of a piece of biometric authentication data delivered and a second step for comparing this biometric "signature" with the signatures or reference biometric data contained in a preliminarily identified data base in order to deliver a decision on authentication.

The first step corresponds to the application of a classic specific processing operation to the biometric sample so as to obtain a signature which can then be compared with other pieces of information of the same type. This signature is obtained by signature-creation algorithms known per se in biometrics.

The second step makes successive comparisons of the signature obtained during the previous step with each of the pieces of reference biometric data or reference signatures stored in the base concerned, solely for the terminals connected to the reference base stations. Depending on predetermined criteria, an authentication decision is delivered. This authentication decision is positive when a reference signature corresponds to a signature obtained. It is negative when none of the reference signatures contained in the base corresponds, solely for the terminals connected to the reference base station.

Thus, it will easily be understood that this second step of authentication is faster than the method according to an embodiment of the invention because the maximum number of comparisons that it can make corresponds to a limited number of signatures and not the total number of signatures stored in the authentication system.

In addition, another advantage of the method of authentication of an embodiment of the invention lies in the distribution itself of the biometric data between the different base stations.

Indeed, the method of an embodiment of the invention minimizes the risks of collision, i.e. the risks, for a same base station, of having pieces of biometric data of proximate users which could be considered by an authentication system to be identical. This advantage is directly linked to the use of the base stations and the mobile devices to enable a filtering and lead to the authentication of the user.

According to one specific embodiment of the invention, the transactional terminal is directly connected to the mobile communications network of the operator. Indeed, in the embodiments presented here above, the transactional terminal is connected to a network by means of a wire access. This means that the authentication method must implement an identification of the base station and of the mobile devices connected (or recently connected) to this base station to carry out a filtering of the biometric data to be compared.

In this specific embodiment of the invention, the transactional terminal is itself connected to the mobile network of the communications operator. Thus, obtaining the identifier of the base station and the identifiers of the mobile devices is greatly facilitated: the base station is the one to which the transactional terminal is connected and the mobile devices are those that are connected to this same base station.

Apart from the authentication method as described here above, an embodiment of the invention also relates to an authentication system comprising means to implement the method described here above.

4. Other Embodiments and Complementary Characteristics

4.1. Transmission of the Confidential Code

According to one particular characteristic of an embodiment of the invention, the confidential code entered by the user is transmitted to the operator with the biometric data (i.e. either at the same time as the biometric data or before the biometric data). This has a very big practical advantage because it makes the identification of the user almost immediate.

Indeed, when the confidential code is transmitted to the operator with the biometric print, the operator reduces the subset of pieces of reference biometric data to be compared (a subset that is already very restricted), of the users present near the base station to the subset of users who are present near the base station and have a given confidential code.

The probability that two users will have the same confidential code is already small (but it is not zero). In the rare event of such a collision occurring, this particular characteristic of an embodiment of the invention makes it possible to separate the two users by comparing their biometric prints with the print transmitted by the transactional terminal. It is important to note that even if only one user having the confidential code transmitted by the transactional terminal is identified in the field of the base station, the comparison of the biometric data always remains necessary for validating a transaction.

4.2. Connectivity of the Transactional Terminal

According to one particular embodiment of the invention, the geographical position of the transactional terminal can be inferred also, and automatically, from the fact of its being taken over by a given base station (this means assuming that the transactional terminal is equipped with a SIM card, which is very common). This is important because such an implementation can totally do away with any notion of geographical coordinates. The fact that mobile telephones are in the field of a base station also covering a transactional terminal means that the mobile telephones are in proximity to the transactional terminal in question. This is enough for the comparison. The major advantages of this method are:
1. it does not require any geographical steps to be taken in the field;
2. it can be adapted automatically to door-to-door salesmen carrying mobile terminals.

4.3. Extension of the Localization Zone

According to one particular characteristic of an embodiment of the invention, the comparison of the biometric print sent by the transactional terminal is not limited to the prints of users present in the field of the base station covering the transactional terminal. In such a variant, the comparison of the prints sent by the transactional terminal is extended to the prints of the users present in the fields of the base stations adjacent to or close to the station covering the transactional terminal. Indeed, it is not rare that, for reasons of network congestion, a user may be attached to a base station that is slightly more distant but less congested at a given point in time.

4.4. Multiplicity of Users and Terminals

According to one particular embodiment of the invention, during the stage for registering users, the system enables the association of several fingerprints with the same telephone (for example the same telephone may serve to identify different members of the same family who take turns to use this apparatus). Similarly, one and the same fingerprint can quite easily be associated with several telephones (for example a person may have several subscriptions and pay with any of the telephones that he possesses).

4.5. Selecting the Mobile Operator

According to one particular embodiment of the invention, the method comprises a step for identifying a communications operator to whom the pieces of biometric data of the user are transmitted. Indeed, the problem with having numerous operators is that, once the fingerprint has been acquired, the transactional terminal must know which operator this fingerprint must be sent to for comparison. This identification can be done by several methods:

- the transactional terminal offers the salesman a choice between various operators (e.g. "Operator #1: type 1, Operator #2, type 2, Operator #3, type 3"). The salesmen puts this question to the user vocally and enters the information on the keypad of the transactional terminal (in this case 1, 2 or 3) thus enabling the fingerprint to be sent to one operator in particular for purposes of comparison.
- or the pieces of biometric data are transmitted automatically to all the operators who take responsibility for comparing it with their own data bases.
- or again the user is asked again to enter his confidential code on the transactional terminal before transmitting the pieces of biometric data to the operator. The confidential code then encodes a piece of information indicating which operator is concerned (for example the last decimal digit of the confidential code will be a digit characterizing the operator: 1 for Operator #1, 2 for Operator #2, 3 for Operator #3, etc). On the basis of this encoded piece of information called an "operator identifier encoded in the confidential code", the transactional terminal routes the data to the right operator.
- or again the manager of the system creates a central data base grouping together all the biometric data of all the users, whichever is their operator. The operators provide real-time information on the approximate position of their subscribers present in the central data base and it is the manager of the system who performs the operations for identifying the print.

It is important to note in any case that the presentation of the confidential code is optional. Naturally, an implementation without confidential codes generates fewer advantages but it will always work.

According to one particular embodiment of the invention, when the user is a subscriber of a foreign operator (OE) having a roaming agreement with a national operator (ON), the following procedure is followed: the presence of a foreign subscriber in the domain of the base station of an ON is a piece of information known to the ON. The ON then performs the following two operations (in any order or even simultaneously to gain time): 1. The ON searches for biometric data and the confidential code in its data base. If the biometric data and the confidential code are found in the data base of the ON, the system works as explained here above. 2. The ON transmits the biometric data to be compared and the confidential code entered by the user to all the OEs with whom there is a roaming agreement and whose subscribers are present in the vicinity of the base station concerned. The OEs then compare the biometric data and the confidential code transmitted by the ON with their data bases. If the biometric data and the confidential code are found in the data base of an OE, the OE in question reports this fact to the ON and the system proceeds as explained here above.

According to one particular characteristic of an embodiment of the invention, when the user is a subscriber of a foreign operator (OE) having a roaming agreement with a national operator (ON), the following procedure is used: the presence of a foreign subscriber in the domain of the base station of the ON is a piece of information known to the ON. The ON then makes a request for transfer of information to the OE. Upon reception of such a request for transferring information, the OE sends the ON the biometric data of the subscriber as well as the associated confidential code. Thus, the foreign subscriber is dynamically added to the system of the ON and this foreign subscriber who is roaming can make payment operations. In order not to congest the ON's data base in the long term, a foreign subscriber thus added to an ON's data base is erased from the list when the ON notes that he is absent from the national territory over a certain period of time (for example two weeks, which would mean for example that the tourist has returned to his country).

4.6. Selecting One Characteristic of the User

According to one particular characteristic of an embodiment of the invention, prior to the entry of the biometric data by the user, the salesman notes the sex (whether male or female) of the user who has placed his or her finger on the transactional terminal and enters this information by hand into the transactional terminal (for example he presses the key 1 for man and 2 for woman). This piece of information is transmitted to the operator with the biometric data. Each recording in the operator's biometric data base includes a "sex" field. Thus, statistically the operations for comparing fingerprints is done at double speed. The time needed for authentication is therefore statistically halved.

4.7. Temporal Latency

According to one embodiment of the invention, the method implements a notion of "temporal latency of tolerance". In the embodiments described here above, the user is in the proximity of a base station. In this embodiment of the invention, the method is also adapted to users who, until very recently (for example less than five minutes earlier), had been near a base station. Such an embodiment takes account of the connection indicators which are positioned in base stations and/or base station controllers (BSC) and/or in telephone exchanges (MSCs) and/or in registers (VLR or Visitor Location Registers, HLR or Home Location Registers) and other apparatuses situated in the core of the network. Indeed, when the mobile devices move within the operator's communications network, their passages at the base stations are marked (for example in the VLR or the HLR but also in other apparatuses). This marking is used especially in the context of "handover" procedures in order to accelerate the transition of the mobile device from one base station to another. In this embodiment of the invention, the inventors have had the idea of using this marking process to verify the recent presence of the mobile device in the coverage zone of the base station.

For example, the operation is adapted to particular situations such as the typical case of an underground parking lot where there is no reception of signals for mobile communications terminals. The mobile network has noted the presence of a user in the network and then lost him. One minute later a request for payment comes from the transactional terminal of the parking lot and it is then that the user can no longer be detected.

In this embodiment, the information on presence of the user has been kept at the base station or in the communications network so that, even though the user is no longer attached to the base station in question, it is possible to compare the entered pieces of biometric data with those of the users whose signals have recently been lost.

The utility and efficiency of the system using this embodiment of the invention are then greatly improved.

4.8. Offline Authentication

According to one particular characteristic of an embodiment of the invention, a variant of the method enables an authentication to be performed in "disconnected" mode. In this variant, the network transmits, at regular intervals to all the transactional terminals in proximity to a given user, his biometric data and confidential code in case he should decide to use one of the transactional terminals. When a user leaves the vicinity of a base station, the network gives the concerned transactional terminals an order to erase his biometric data and confidential code.

Thus, in case of a request for a transaction, the transactional terminal already has all the necessary information at its disposal and can carry out the authentication without its being necessary to make a connection.

This embodiment is particularly suited to low-density shopping areas, having few payment points and a limited number of mobile terminals. According to one particular characteristic of an embodiment of the invention, the transmission of the biometric data and of the confidential codes to the transactional terminal in the case explained here above is implemented during the inactivity of the transactional terminal. Thus, the probability of not needing to go online is increased and therefore the transaction time is statistically diminished.

In another embodiment of the invention, each base station permanently receives and records the biometric data and the confidential codes of the users that it is managing. When a user travels in transit to a new base station, the base station to which he was previously connected transmits these pieces of data to the new base station concomitantly with the handover procedure or subsequently to this procedure. Thus, the new base station is spared the need to resort to the core network when implementing the authentication method according to an embodiment of the invention.

An illustrative embodiment of the invention can be applied especially to mobile devices such as cell phones, portable GPS units, personal digital assistants (PDAs), laptops and all other apparatuses (mobile devices) designed to communicate through a mobile telecommunications network, possess or be the source of a piece of information on precise and approximate location and generally be within reach of their owners.

An illustrative embodiment also applies to transaction verification and acquisition devices such as payment and identity verification terminals, electronic locks, cash registers and access control terminals, public transport terminals (known as called "transactional terminals"). These devices are designed to communicate through a telecommunications network and have a precise or approximate geographical localization known to their managers.

An embodiment of the provides a technique of biometric identification that is swift and reliable in the case of a system referencing a very large number of users to enable the user to perform an action such as a payment.

An embodiment of the provides a technique of this kind that is also ergonomical for the user.

An embodiment of the invention provides a technique of this kind that costs little and is easy to implement.

The invention claimed is:

1. A method of biometric authentication of a user to be authenticated, from among a plurality of users, with an authentication system storing a set of pieces of reference biometric data, each associated with one of said users, the method including:
   receiving, by a transaction terminal, a piece of biometric authentication data obtained from a user to be authenticated through a device associated with said transaction terminal and configured for obtaining biometric data; and
   searching, in a subset of said set of pieces of reference biometric data stored by said authentication system, for a piece of reference biometric data corresponding to said user to be authenticated, as a function of said piece of biometric authentication data, wherein searching comprises filtering said pieces of reference biometric data, which comprises:
     identifying a base station of a mobile communications network, said transactional terminal being situated in a zone of coverage of said base station;
     identifying a set of mobile devices for which a connection indicator is activated for said base station, delivering a set of identifiers of candidate mobile devices;
     obtaining said subset of said set of pieces of reference biometric data as a function of said set of identifiers of the candidate mobile devices, and
     wherein said filtering delivers said subset of said set of pieces of reference biometric data.

2. The method of biometric authentication according to claim 1, wherein said pieces of biometric data belong to the group consisting of:
   fingerprints;
   palm prints;
   retinal prints;
   iris prints;
   facial shapes; and
   combinations of said pieces of biometric data mentioned here above.

3. The method of biometric authentication according to claim 1, wherein said filtering further comprises entering a piece of information representing the sex of said user.

4. The method of biometric authentication according to claim 1, wherein said filtering further comprises selecting a telephone operator with whom said user's said mobile device is registered.

5. The method of biometric authentication according to claim 1, wherein the method further comprises receiving a confidential code entered by said user.

6. The method of biometric authentication according to claim 5, wherein said confidential code is transmitted to said authentication system concomitantly with said pieces of biometric data provided by said user.

7. The method of authentication according to claim 1, wherein said transactional terminal is a mobile payment terminal connected to said mobile communications network to which said base station belongs.

8. The method of authentication according to claim 1, wherein said transactional terminal is connected to said base station.

9. The method of authentication according to claim 1, wherein the method further comprises transmitting, to said transactional terminal, said subset of said set of pieces of biometric data and said filtering step is implemented within said transactional terminal.

10. The method of authentication according to claim 1, wherein the method further comprises transmitting, to a destination base station to which said user is liable to get connected, pieces of biometric data of said user, said transmitting being done through a current base station to which said user is connected.

11. A system for biometric authentication of a user to be authenticated, from among a plurality of users, with an authentication system storing a set of pieces of reference biometric data, each associated with one of said users, the system comprising:
  a processor configured by program code instructions to:
  receive a piece of biometric authentication data entered by a user to be authenticated through a device for obtaining biometric data, which is associated with a transactional terminal; and
  search, in a subset of said set of pieces of reference biometric data stored by said authentication system, for a piece of reference biometric data corresponding to said user to be authenticated, as a function of said piece of biometric authentication data, wherein searching comprises filtering said pieces of reference biometric data, which comprises:
    identifying a base station of a mobile communications network, said device for obtaining biometric data being situated in a zone of coverage of said base station;
    identifying a set of mobile devices for which a connection indicator is activated for said base station, delivering a set of identifiers of candidate mobile devices;
    obtaining said subset of said set of pieces of reference biometric data as a function of said set of identifiers of the candidate mobile devices, and
    wherein said filtering delivers said subset of said set of pieces of reference biometric data.

12. A non-transitory computer-readable carrier comprising a computer program product recorded thereon, wherein the computer program product comprises program code instructions to implement a method biometrically authenticating a user to be authenticated, from among a plurality of users, with an authentication system storing a set of pieces of reference biometric data, each associated with one of said users, the method including:
  receiving a piece of biometric authentication data obtained from a user to be authenticated through a device associated with a transaction terminal and configured for obtaining biometric data; and
  searching, in a subset of said set of pieces of reference biometric data stored by said authentication system, for a piece of reference biometric data corresponding to said user to be authenticated, as a function of said piece of biometric authentication data, wherein searching comprises filtering said pieces of reference biometric data, which comprises:
    identifying a base station of a mobile communications network, said transactional terminal being situated in a zone of coverage of said base station;
    identifying a set of mobile devices for which a connection indicator is activated for said base station, delivering a set of identifiers of candidate mobile devices;
    obtaining said subset of said set of pieces of reference biometric data as a function of said set of identifiers of the candidate mobile devices, and
    wherein said filtering delivers said subset of said set of pieces of reference biometric data.

* * * * *